(12) United States Patent
Pacala et al.

(10) Patent No.: US 10,613,201 B2
(45) Date of Patent: *Apr. 7, 2020

(54) THREE-DIMENSIONAL LIDAR SENSOR BASED ON TWO-DIMENSIONAL SCANNING OF ONE-DIMENSIONAL OPTICAL EMITTER AND METHOD OF USING SAME

(71) Applicant: Quanergy Systems, Inc., Sunnyvale, CA (US)

(72) Inventors: Angus Pacala, San Francisco, CA (US); Louay Eldada, Sunnyvale, CA (US)

(73) Assignee: Quanergy Systems, Inc., Sunnyvale, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/019,144

(22) Filed: Jun. 26, 2018

(65) Prior Publication Data

US 2018/0306907 A1      Oct. 25, 2018

Related U.S. Application Data

(63) Continuation of application No. 14/517,948, filed on Oct. 20, 2014, now Pat. No. 10,036,803.

(51) Int. Cl.
*G01S 7/481*      (2006.01)
*G01S 17/10*      (2020.01)
(Continued)

(52) U.S. Cl.
CPC .......... *G01S 7/4817* (2013.01); *G01S 7/4813* (2013.01); *G01S 7/4814* (2013.01); *G01S 17/10* (2013.01); *G01S 17/42* (2013.01); *G01S 17/89* (2013.01)

(58) Field of Classification Search
CPC ...... G01S 7/4817; G01S 17/10; G01S 7/4813; G01S 7/4814; G01S 17/89; G01S 17/42
See application file for complete search history.

(56) References Cited

U.S. PATENT DOCUMENTS 3,064,252 A    11/1962   Varela
3,636,250 A     1/1972   Haeff
(Continued)

FOREIGN PATENT DOCUMENTS

| CN | 107148580 A | * | 9/2017 | ............. | G01S 17/42 |
| EP | 3210036 A1 | * | 8/2017 | ............. | G01S 17/42 |

(Continued)

OTHER PUBLICATIONS

Aull, B.F. et al. (2002). "Geiger-mode avanlanche photodiodes for three-dimensional imaging," Lincoln Labora. J. 13:335-350.
(Continued)

*Primary Examiner* — Daniel Pihulic
(74) *Attorney, Agent, or Firm* — Cooley LLP

(57) ABSTRACT

An apparatus and method are used for three-dimensional sensing with a time-of-flight lidar sensor having a single emitter sensing in one dimension, at least one photodetector, and a mechanical means of scanning in two dimensions said emitter and at least one photodetector. The external case of the lidar is preferably static, and only internal components involve mechanical motion. In a preferred embodiment of said lidar when operated in the infrared, said external static case has a window that is visually opaque and essentially transparent to infrared radiation.

3 Claims, 3 Drawing Sheets

(51) Int. Cl.
*G01S 17/42* (2006.01)
*G01S 17/89* (2020.01)

(56) References Cited

U.S. PATENT DOCUMENTS

| | | | |
|---|---|---|---|
| 3,781,111 | A | 12/1973 | Fletcher et al. |
| 3,781,552 | A | 12/1973 | Kadrmas |
| 3,897,150 | A | 7/1975 | Bridges et al. |
| 4,179,216 | A | 12/1979 | Theurer et al. |
| 4,477,164 | A | 10/1984 | Endo |
| 4,542,986 | A | 9/1985 | Berdanier |
| 4,952,911 | A | 8/1990 | D'Ambrosia et al. |
| 5,132,843 | A | 7/1992 | Aoyama et al. |
| 5,210,586 | A | 5/1993 | Grage et al. |
| 5,243,672 | A | 9/1993 | Dragone |
| 5,455,669 | A | 10/1995 | Wetteborn |
| 5,543,805 | A | 8/1996 | Thaniyavarn |
| 5,552,893 | A | 9/1996 | Akasu |
| 5,682,229 | A | 10/1997 | Wangler |
| 5,691,687 | A | 11/1997 | Kumagai et al. |
| 5,877,688 | A | 3/1999 | Morinaka et al. |
| 5,898,483 | A | 4/1999 | Flowers |
| 5,898,491 | A | 4/1999 | Ishiguro et al. |
| 6,747,747 | B2 | 6/2004 | Hipp |
| 6,765,663 | B2 | 7/2004 | Byren et al. |
| 6,891,987 | B2 | 5/2005 | Lonov et al. |
| 7,000,721 | B2 | 2/2006 | Sugawara et al. |
| 7,030,968 | B2 | 4/2006 | D'Aligny et al. |
| 7,190,465 | B2 | 3/2007 | Froehlich et al. |
| 7,281,891 | B2 | 10/2007 | Smith et al. |
| 7,339,727 | B1 | 3/2008 | Rothenberg et al. |
| 7,406,220 | B1 | 7/2008 | Christensen et al. |
| 7,428,100 | B2 | 9/2008 | Smith et al. |
| 7,436,588 | B2 | 10/2008 | Rothenberg et al. |
| 7,489,870 | B2 | 2/2009 | Hillis et al. |
| 7,532,311 | B2 | 5/2009 | Henderson et al. |
| 7,555,217 | B2 | 6/2009 | Hillis et al. |
| 7,746,449 | B2 | 6/2010 | Ray et al. |
| 7,915,626 | B1 | 3/2011 | Allerman et al. |
| 7,969,558 | B2 | 6/2011 | Hall |
| 8,125,367 | B2 | 2/2012 | Ludwig |
| 8,192,029 | B2 | 6/2012 | Takeda et al. |
| 8,203,115 | B2 | 6/2012 | Hochberg et al. |
| 8,311,374 | B2 | 11/2012 | Hochberg et al. |
| 8,731,247 | B2 | 5/2014 | Pollock |
| 8,836,922 | B2 | 9/2014 | Pennecot et al. |
| 8,988,754 | B2 | 3/2015 | Sun et al. |
| 9,014,903 | B1 | 4/2015 | Zhu et al. |
| 9,069,080 | B2 | 6/2015 | Stettner et al. |
| 9,104,086 | B1 | 8/2015 | Davids et al. |
| 9,332,243 | B2 | 5/2016 | Klusza et al. |
| 9,383,753 | B1 | 7/2016 | Templeton et al. |
| 9,753,351 | B2 | 9/2017 | Eldada |
| 9,869,753 | B2 | 1/2018 | Eldada |
| 10,036,803 | B2 * | 7/2018 | Pacala ................. G01S 17/42 |
| 2002/0051615 | A1 | 5/2002 | Walpole et al. |
| 2002/0149760 | A1 | 10/2002 | Hipp |
| 2003/0090646 | A1 | 5/2003 | Riegl et al. |
| 2005/0033497 | A1 | 2/2005 | Stopczynski |
| 2005/0053347 | A1 | 3/2005 | West et al. |
| 2006/0091303 | A1 | 5/2006 | Evans |
| 2006/0091305 | A1 | 5/2006 | Grunnet-Jepsen et al. |
| 2006/0197936 | A1 | 9/2006 | Libeman et al. |
| 2006/0239688 | A1 | 10/2006 | Hillis et al. |
| 2007/0052947 | A1 | 3/2007 | Ludwig et al. |
| 2007/0065002 | A1 | 3/2007 | Marzell et al. |
| 2007/0181810 | A1 | 8/2007 | Tan et al. |
| 2007/0279615 | A1 | 12/2007 | Degnan et al. |
| 2008/0002176 | A1 | 1/2008 | Krasutsky |
| 2008/0055556 | A1 | 3/2008 | Takeda et al. |
| 2008/0094607 | A1 | 4/2008 | Bernard et al. |
| 2008/0112065 | A1 | 5/2008 | Wo et al. |
| 2008/0186470 | A1 | 8/2008 | Hipp |
| 2008/0204699 | A1 | 8/2008 | Benz et al. |
| 2008/0227292 | A1 | 9/2008 | Miki |
| 2008/0278715 | A1 | 11/2008 | Swenson et al. |
| 2009/0059201 | A1 | 3/2009 | Willner et al. |
| 2009/0251680 | A1 | 10/2009 | Farsaie |
| 2009/0278030 | A1 | 11/2009 | Deliwala |
| 2010/0045964 | A1 | 2/2010 | Jin et al. |
| 2010/0187402 | A1 | 7/2010 | Hochberg et al. |
| 2010/0187442 | A1 | 7/2010 | Hochberg et al. |
| 2010/0253585 | A1 | 10/2010 | Llorens del Rio et al. |
| 2010/0271614 | A1 | 10/2010 | Albuquerque et al. |
| 2010/0290029 | A1 | 11/2010 | Hata |
| 2011/0216304 | A1 | 9/2011 | Hall |
| 2011/0222814 | A1 | 9/2011 | Krill et al. |
| 2011/0255070 | A1 | 10/2011 | Phillips et al. |
| 2011/0316978 | A1 | 12/2011 | Dillon et al. |
| 2012/0013962 | A1 | 1/2012 | Subbaraman et al. |
| 2012/0226118 | A1 | 9/2012 | Delbeke et al. |
| 2012/0281293 | A1 | 11/2012 | Gronenborn et al. |
| 2012/0286136 | A1 | 11/2012 | Krill et al. |
| 2013/0027715 | A1 | 1/2013 | Imaki et al. |
| 2013/0044309 | A1 | 2/2013 | Dakin et al. |
| 2013/0114924 | A1 | 5/2013 | Loh et al. |
| 2013/0127980 | A1 | 5/2013 | Haddick et al. |
| 2013/0208256 | A1 | 8/2013 | Mamidipudi et al. |
| 2013/0242400 | A1 | 9/2013 | Chen |
| 2013/0301976 | A1 | 11/2013 | Saida et al. |
| 2014/0152871 | A1 | 6/2014 | Campbell et al. |
| 2014/0211194 | A1 | 7/2014 | Pacala et al. |
| 2014/0240691 | A1 | 8/2014 | Mheen |
| 2014/0376001 | A1 | 12/2014 | Swanson |
| 2015/0079770 | A1 | 3/2015 | Werer, Jr. et al. |
| 2015/0125157 | A1 | 5/2015 | Chao et al. |
| 2015/0131080 | A1 | 5/2015 | Retterath et al. |
| 2015/0192677 | A1 | 7/2015 | Yu et al. |
| 2015/0293224 | A1 | 10/2015 | Eldada et al. |
| 2015/0346340 | A1 | 12/2015 | Yaacobi et al. |
| 2015/0378187 | A1 | 12/2015 | Heck et al. |
| 2015/0378241 | A1 | 12/2015 | Eldada |
| 2016/0047901 | A1 | 2/2016 | Pacala et al. |
| 2016/0049765 | A1 | 2/2016 | Eldada |
| 2016/0161600 | A1 | 6/2016 | Eldada et al. |
| 2017/0299700 | A1 * | 10/2017 | Pacala ................. G01S 17/42 |
| 2018/0306907 | A1 * | 10/2018 | Pacala ................. G01S 17/42 |

FOREIGN PATENT DOCUMENTS

| | | | | |
|---|---|---|---|---|
| EP | 3210036 | A4 * | 7/2018 | ............ G01S 7/4813 |
| JP | H-3-6407 | A | 1/1991 | |
| JP | 10-325872 | A | 12/1998 | |
| JP | 3-120491 | B2 | 12/2000 | |
| JP | 2002-323561 | A | 11/2002 | |
| JP | 2006-177843 | A | 7/2006 | |
| JP | 2008-064794 | A | 3/2008 | |
| JP | 2010-271306 | A | 12/2010 | |
| KR | 20170071523 | A * | 6/2017 | ............. G01S 17/42 |
| WO | WO-2016064915 | A1 * | 4/2016 | ............. G01S 17/42 |

OTHER PUBLICATIONS

Avalanche Photodiode (2011). User Guide. Excelitas Technologies. 8 total pages.

American National Standard for Safe Use of Lasers (2000). ANSI. ANSI Z136.1—2000.

The American Heritage Dictionary (1996). Third edition. Houghton Mifflin Company, pp. 1497, 1570, 1697, 1762 and 1804.

Besl, P.J. (1968). "Active, optical range imaging sensors," Mach. Vision Applic. 1:127-152.

Bordone, A. et al. (2003). "Development of a high resolution laser radar for 3D imaging in artwork cataloguing," SPIE 5131:244-248.

Code of Federal Regulations (2005). Parts 800 to 1299. 21 C.F.R. Section 1040.10, 23 total pages.

Doylend et al. (2012). "Hybrid III/V silicon photonic source with integrated 1D free-space beam steering," Optics Letters 37:4257-4259.

Extended European Search Report dated Jan. 26, 2018, for EP Application No. 15 830 163.0, filed on Jun. 23, 2015, 10 pages.

Extended European Search Report dated Mar. 12, 2018, for EP Application No. 15 832 162.0, filed on Aug. 6, 2015, 10 pages.

(56) References Cited

OTHER PUBLICATIONS

Extended European Search Report dated Jun. 6, 2018, for EP Application No. 15 852 806.7, filed on Oct. 20, 2015, 6 pages.
File History for U.S. Pat. No. 7,969,558, dated Jun. 28, 2011, 274 total pages.
Guo et al., "InP Photonic Integrated Circuit for 2D Optical Beam Steering", Photonics Conference, Oct. 9-13, 2011, Arlington, VA, IEEE, 2011, 3 pgs.
Guo et al., "Two-Dimensional optical Beam Steering with Inp-Based Photonic Integrated Circuits", IEEE Journal of Selected Topics in Quantum Electronics, vol. 19, No. 4, Aug. 2013, pp. 1, 6, 3, 11.
Guo et al., (2013). "Two-Dimensional optical Beam Steering with InP-Based Photonic Integrated Circuits", IEEE Journal of Selected Topics in Quantum Electronics 19:6100212, 12 total pages.
Gustavson, R.L. (1992), "Diode-laser radar for low-cost weapon guidance," Laser Radar VII 1633:21-32.
Hulme et al., "Fully Integrated Hybrid Silicon Free-Space Beam Steering Source with 32 Channel Phased Array", SPIE, Mar. 26, 2014, pp. 898907-2, 898907-13.
Jelalian, A.V. (1992). "Laser radar systems," 3 total pages.
Jie, S. et al. (2013). "Large-scale silicon photonic circuits for optical phased arrays," IEEE J. Selected Topics in Quantum Electronics 20:1-15.
Intellectual Property Office of Singapore, Written Opinion issued to SG application No. 11201610963X, dated Oct. 5, 2017, 5 pgs.
International Search Report and Written Opinion issued to international patent application No. PCT/US15/56516, dated Feb. 4, 2016, 7 pgs.
International Search Report and Written Opinion issued to International Patent Application No. PCT/US15/44069, dated Nov. 12, 2015, 9 pgs.
International Search Report and Written Opinion issued to International Patent Application No. PCT/US17/60029, dated Jan. 23, 2018, 8 pgs.
Kamerman, G.W. (1993). Chapter 1: Laser radar. vol. 6. The infrared and electro-optical systems handbook. 4 total pages.
Kamerman, G.W. (1993). Chapter 1: Laser radar. vol. 6. The infrared and electro-optical systems handbook. 80 total pages.
Kawata, H. et al. (2005). "Development of ultra-small lightweight optical range sensor system," 7 total pages.
Kawata, H. et al. (2005). "Development of ultra-small lightweight optical range sensor system," 63 total pages.
Kilpela, A. et al. (2001). "Precise pulsed time-of-flight laser range finder for industrial distance measurements," Rev. Scientific Instruments 72:2197-2202.
LaserFocusWorld (1995), "How to select avalanche photodiodes," 9 total pages.
Manandhar, D. et al. (2002). "Auto-extraction of urban features from vehicle-borne laser data," 6 total pages.
Richmond, R.D. et al. (2005). "Polarimetric imaging laser radar (PILAR) program," Adv. Sens. Payloads for UAV 35 total pages.
Saleh, B.E.A, et al. (1991). Fundamentals of Photonics. John Wiley & Sons, Inc. 162 total pages.
Skoinik, M.I. (1980). "Introduction to radar systems," Second edition. McGraw-Hill Book Company. p. 7.
Skoinik, M.I. (1990). "Radar handbook," Second edition, McGraw-Hill Publishing Company. 1191 total pages.
Taillaert et al., "An Out-Of-Plane Grating Coupler for Efficient Butt-Coupling Between Compact Planar Waveguides and Single-Mode Fibers", IEEE Journal of Quanturri Electronics, vol. 38, No. 7, Jul. 2002, pp. 951-953.
Ullrich, A. et al. (1999), "High-performance 3D-imaging laser sensor," SPIE 3707:658-664.
Van Acoleyen, Karel, "Nanophotonic Beamsteering Elements Using Silicon Technology for Wireless Optical Applications", Ghent University, Dept. of Information Technology, Aug. 27, 2012, 180 pgs.
Van Acoleyen, Karel, "Off-Chip Beam Steering with a One-Dimensional Optical Phased Array on Silicon-On-Insulator", Optics Letters, vol. 34, No. 9, May 1, 2009, pp. 1477-1479.
Westinghouse (date unknown). AN/TPS-43E Tactical radar system, 14 total pages.

\* cited by examiner

THREE-DIMENSIONAL LIDAR SENSOR BASED ON TWO-DIMENSIONAL SCANNING OF ONE-DIMENSIONAL OPTICAL EMITTER AND METHOD OF USING SAME

CROSS REFERENCE TO RELATED APPLICATIONS

This application claims priority to U.S. patent application Ser. No. 14/517,948 filed on Oct. 20, 2014, the contents of which are incorporated herein by reference.

FIELD OF THE INVENTION

The present invention relates generally to the field of environment sensing, and more particularly to cost-effective Time of Flight (ToF) lidar sensor apparatus for three-dimensional mapping and object detection, tracking and/or classification.

BACKGROUND OF THE INVENTION

A lidar sensor is a light detection and ranging sensor. It is an optical remote sensing module that can measure the distance to a target or objects in a landscape, by irradiating the target or landscape with light, using pulses from a laser, and measuring the time it takes photons to travel to said target or landscape and return after reflection to a receiver in the lidar module. Lidar sensors based on mechanical motion achieve a wide field of view. The cost and resolution of mechanical-motion lidar sensors containing multiple discrete individually packaged lasers are not optimal, as having a plurality of individually-packaged lasers is costly and scanning the environment in planes defined by individual collimated lasers does not achieve an acceptable resolution in some applications, especially ones where the lidar mounting platform is static (e.g., on a pole for use in road/intersection/traffic monitoring) or when the lidar mounting platform is generally mobile but has scenarios where it is static (e.g., a vehicle stopped at a traffic light that needs to sense pedestrians across the intersection, a situation where it cannot benefit from the laser beam sweeping obtained when the vehicle is moving/shaking/vibrating).

U.S. Pat. No. 5,455,669 discloses a laser range finding apparatus comprising a mirror mounted for rotation along a vertical axis parallel to the vertical axis of light from a pulsed laser being emitted for deflection into the measurement region, and angularly inclined with respect to the plane of rotation and the vertical axis to cause pulsed light from the collimated laser to be diverted over the planar measurement field and reflected light from the measurement region to be received from the planar measurement region and diverted along a vertical path to a photoreceiver arrangement.

U.S. Pat. No. 7,746,449 discloses a light detection and ranging system, comprising a collimated laser beam, a mirror unit rotating around a scan axis, the mirror unit including a receiving portion and a transmitting portion offset by an angle about the scan axis relative to a surface plane of the receiving portion, respective centroids of the receiving and transmitting portions being positioned at a common point on the scan axis.

U.S. Pat. No. 7,969,558 discloses a lidar-based 3-D point cloud system comprising a support structure, a plurality of laser emitters supported by the support structure, a plurality of avalanche photodiode detectors supported by the support structure, and a rotary component configured to rotate the plurality of laser emitters and the plurality of avalanche photodiode detectors at a speed of at least 200 RPM (rotations per minute).

US application 2011/0216304 discloses a LiDAR-based sensor system comprising a base, head assembly, a rotary component configured to rotate the head assembly with respect to the base, the rotation of the head assembly defining an axis of rotation; an electrical motherboard carried in the head assembly, the motherboard defining a plane and being positioned substantially parallel to the axis of rotation, a plurality of photon transmitters mounted to a plurality of emitter circuit boards, the plurality of emitter circuit boards being mounted directly to the motherboard, and a plurality of detectors mounted to a plurality of detector circuit boards, the plurality of detector circuit boards being mounted directly to the motherboard.

SUMMARY OF THE INVENTION

An apparatus and method are used for three-dimensional sensing with a time-of-flight lidar sensor having a single emitter and at least one photodetector. Said single emitter can comprise a single laser, a single laser bar, or multiple lasers (preferably in the form of an integrated multi-laser chip, or co-packaged laser chips, or a multi-chip module in a single package), and in all three cases the emitter output is imaged to form a radiation pattern whose envelope is elongated to provide one-dimensional sensing. Said single emitter can also comprise a single laser coupled to an optical phased array (OPA) that either images a radiation pattern whose envelope is elongated to provide one-dimensional sensing, or sweeps a beam in one dimension to provide one-dimensional sensing. Said single emitter can also comprise a single laser coupled to a diffractive optical element (DOE) or a holographic optical element (HOE), with either optical element imaging a radiation pattern whose envelope is elongated to provide one-dimensional sensing. For all single emitter configurations, a mechanical motion (e.g., spinning or mirror/prism/lens/DOE/HOE/grating scanning) is used to cover the two dimensions not covered by the emitter, resulting in three-dimensional sensing.

When a plurality of photodetectors are used, they preferably comprise an integrated multi-photodetector chip, or co-packaged photodetector chips, or a photodetection multi-chip module.

Photodetector types include single-photon avalanche diode (SPAD) arrays, avalanche photodiodes (APD) and PIN diodes (PIN diodes are positive-intrinsic-negative diodes, as they comprise a lightly-doped intrinsic semiconductor region between a 2-type or positive-type semiconductor region and an n-type or negative-type semiconductor region).

As opposed to U.S. Pat. No. 5,455,669 and U.S. Pat. No. 7,746,449, the present invention does not have a static collimated laser in the dimension normal to the plane covered by the mechanical motion, but instead has an emitter than covers said normal dimension through imaging a radiation pattern whose envelope is elongated or through sweeping in said normal dimension.

As opposed to U.S. Pat. No. 7,969,558 and US application 2011/0216304 where the described apparatus comprises a plurality of emitters, the present invention comprises a single emitter. Also, as opposed to APDs, the present invention can use PIN diodes or preferably SPAD arrays. Furthermore, the head assembly is static as opposed to rotating, and only the internal turret is spinning when the mechanical motion consists of spinning, or an optical element (e.g., mirror, prism, lens, DOE, HOE, grating) is scanning when the mechanical motion consists of scanning. The entire external body of the lidar in the present invention is static.

BRIEF DESCRIPTION OF THE DRAWINGS

The following drawings are illustrative of embodiments of the present invention and are not intended to limit the invention as encompassed by the claims forming part of the application.

The schematic diagram of FIG. 1 provides an external view of the lidar 10 of one embodiment of the lidar of the present invention, depicting its static external case 20.

DETAILED DESCRIPTION OF THE INVENTION

Figure 1:
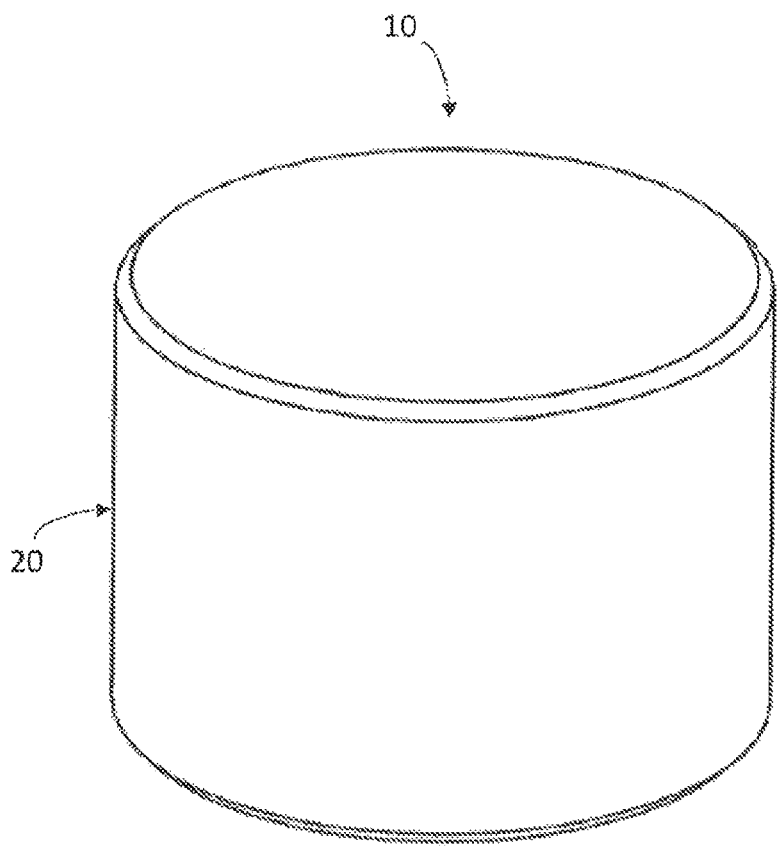
Figure 2:
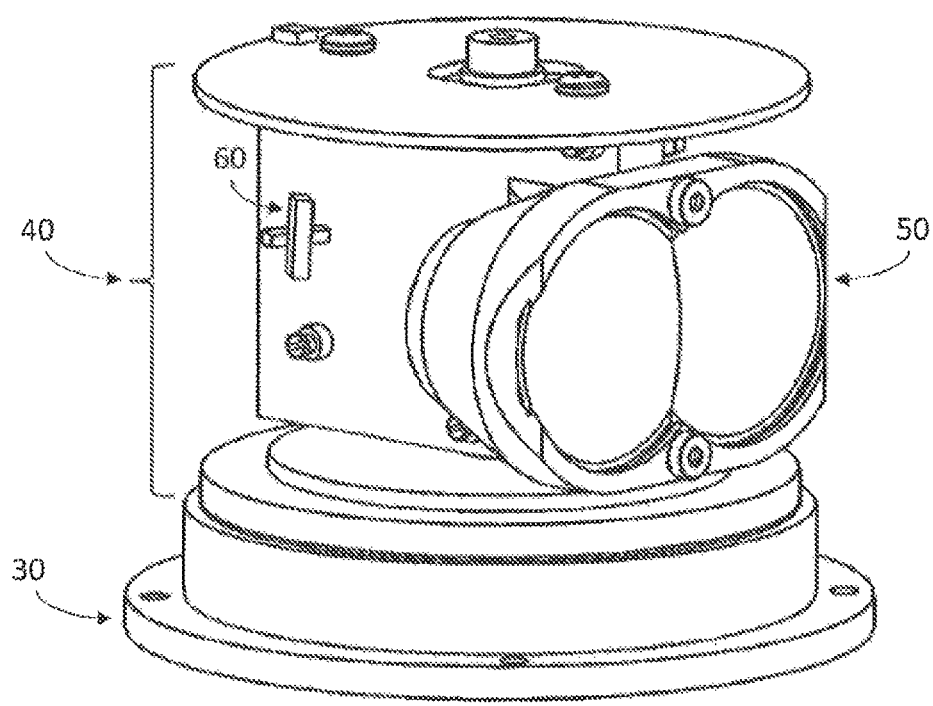
FIG. 2 provides an internal view of one embodiment of the lidar of the present invention angled as to show the emitting side, depicting an internal base 30, a spinning turret 40, an optical imaging assembly 50, and a single emitter 60.
Figure 3:
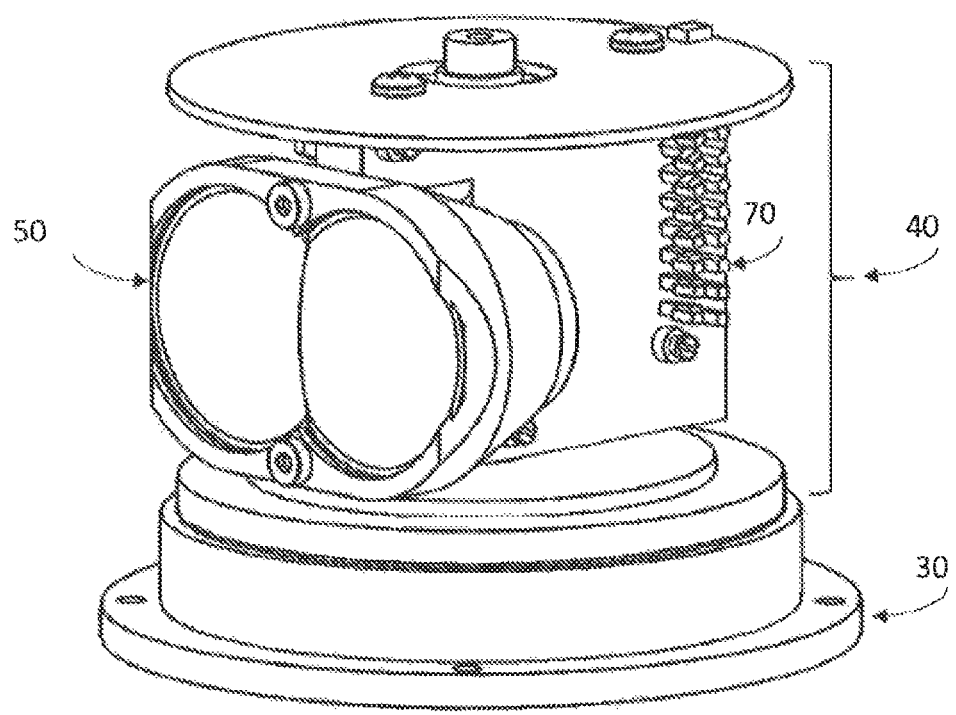
FIG. 3 provides an internal view of one embodiment of the lidar of the present invention angled as to show the receiving side, depicting an internal base 30, a spinning turret 40, an optical imaging assembly 50, and photodetectors 70.

An apparatus and method are used for three-dimensional sensing with a time-of-flight lidar sensor having a single emitter and at least one photodetector.

Said single emitter can comprise:
(a) a single laser
(b) a single laser bar
(c) multiple lasers (preferably in the form of an integrated multi-laser chip, or co-packaged laser chips, or a multi-chip module in a single package)
where in cases (a), (b) and (c) the emitter output is imaged to form a radiation pattern whose envelope is elongated to provide one-dimensional sensing
(d) a single laser coupled to an optical phased array (OPA) that images a radiation pattern whose envelope is elongated to provide one-dimensional sensing
(e) a single laser coupled to an optical phased array (OPA) that sweeps a beam in one dimension to provide one-dimensional sensing
(f) a single laser coupled to a diffractive optical element (DOE)
(g) a single laser coupled to a holographic optical element (HOE)
(h) a single laser coupled to a lens
where in cases (f), (g) and (h), the optical element images a radiation pattern whose envelope is elongated to provide one-dimensional sensing.

For all single emitter configurations, a mechanical motion is used to cover the two dimensions not covered by the emitter, resulting in three-dimensional sensing. The mechanical motion mechanism options include but are not limited to:
(a) spinning
(b) mirror scanning
(c) prism scanning
(d) lens scanning
(e) DOE scanning
(f) HOE scanning
(g) grating scanning When a plurality of photodetectors are used, they preferably comprise but are not limited to the following options:
(a) an integrated multi-photodetector chip
(b) co-packaged photodetector chips
(c) a photodetection multi-chip module Photodetector types include but are not limited to:
(a) SPAD arrays
(b) APDs
(c) PIN diodes The external case of the lidar in the present invention is preferably static, and only internal components involve mechanical motion. In a preferred embodiment of the present invention when operated in the infrared (IR), the window material of said case is visually opaque and IR transparent.

What is claimed is:

1. A time-of-flight lidar apparatus comprising: a) an optical emitter sensing in one dimension, the optical emitter being a laser bar to form a radiation pattern whose envelope is elongated to provide one-dimensional sensing; b) at least one photodetector; c) a spinning turret rotating said emitter and at least one photodetector to provide two-dimensional scanning; and d) an external case that is static to encase the spinning turret, wherein the external static case has a window that is visually opaque and essentially transparent to infrared radiation emitted by the emitter on the spinning turret.

2. The apparatus of claim 1 wherein said at least one photodetector comprises one of a set of elements including but not limited to: a) single-photon avalanche diode arrays; b) avalanche photodiodes; c) positive-intrinsic-negative diodes.

3. The apparatus of claim 1 comprising a plurality of photodetectors in a form selected from a set comprising but not limited to: a) integrated multi-photodetector chip; b) co-packaged photodetector chips; c) photodetection multi-chip module.

* * * * *